United States Patent
Yu et al.

(10) Patent No.: US 9,680,547 B2
(45) Date of Patent: Jun. 13, 2017

(54) METHODS FOR EFFICIENT BEAM TRAINING AND NETWORK CONTROL DEVICE UTILIZING THE SAME

(71) Applicant: MediaTek Inc., Hsin-Chu (TW)

(72) Inventors: Chia-Hao Yu, Yilan (TW); Ming-Po Chang, New Taipei (TW); Jiann-Ching Guey, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 103 days.

(21) Appl. No.: 14/706,098

(22) Filed: May 7, 2015

(65) Prior Publication Data

US 2015/0333811 A1     Nov. 19, 2015

Related U.S. Application Data

(60) Provisional application No. 61/993,576, filed on May 15, 2014.

(51) Int. Cl.
*H04B 7/06*     (2006.01)
*H04W 72/00*     (2009.01)
(Continued)

(52) U.S. Cl.
CPC ........... *H04B 7/0617* (2013.01); *H01Q 1/246* (2013.01); *H01Q 3/26* (2013.01); *H04B 7/0452* (2013.01); *H04B 7/0456* (2013.01); *H04B 7/0695* (2013.01); *H04B 7/0697* (2013.01); *H04W 4/06* (2013.01); *H04W 72/005* (2013.01)

(58) Field of Classification Search
None
See application file for complete search history.

(56) References Cited

U.S. PATENT DOCUMENTS

2006/0035674 A1    2/2006   Karaoguz et al.
2006/0286974 A1   12/2006   Gore et al.
(Continued)

FOREIGN PATENT DOCUMENTS

CN     101064942     10/2007
CN     102547728      7/2012
(Continued)

*Primary Examiner* — Diane Lo
(74) *Attorney, Agent, or Firm* — McClure, Qualey & Rodack, LLP

(57) ABSTRACT

A network control device. A wireless communications module receives a plurality of first signals each including information regarding a preferred transmitting beam in a first beam level determined by a communications apparatus. A controller selects a group of communications apparatuses to join a 1-to-many beam training according to the received first signals and selects one or more transmitting beams in a second beam level to be trained. The communications apparatuses in the group have the same preferred transmitting beam in the first beam level and the transmitting beam(s) in the second beam level associates with the preferred transmitting beam in the first beam level. The wireless communications module further uses the transmitting beam(s) in turn to transmit signals to perform the 1-to-many beam training for training the transmitting beam(s) in the second beam level among the group of communications apparatuses at the same time.

22 Claims, 14 Drawing Sheets

(51) Int. Cl.
H04W 4/06 (2009.01)
H01Q 3/26 (2006.01)
H01Q 1/24 (2006.01)
H04B 7/0452 (2017.01)
H04B 7/0456 (2017.01)

(56) References Cited

U.S. PATENT DOCUMENTS

| | | | | |
|---|---|---|---|---|
| 2012/0162009 | A1* | 6/2012 | Kim | H01Q 3/00 |
| | | | | 342/372 |
| 2013/0072243 | A1* | 3/2013 | Yu | H04B 7/0695 |
| | | | | 455/509 |
| 2013/0121185 | A1* | 5/2013 | Li | H04W 72/046 |
| | | | | 370/252 |
| 2013/0343303 | A1 | 12/2013 | Kim et al. | |
| 2014/0050280 | A1 | 2/2014 | Stirling-Gallacher et al. | |
| 2015/0016379 | A1 | 1/2015 | Nam et al. | |
| 2015/0146812 | A1* | 5/2015 | Chu | H04B 7/0417 |
| | | | | 375/267 |
| 2015/0289147 | A1* | 10/2015 | Lou | H04B 7/0408 |
| | | | | 370/329 |

FOREIGN PATENT DOCUMENTS

| | | |
|---|---|---|
| CN | 102572915 | 7/2012 |
| CN | 103259586 | 8/2013 |
| KR | 20130097117 A | 9/2013 |

\* cited by examiner

METHODS FOR EFFICIENT BEAM TRAINING AND NETWORK CONTROL DEVICE UTILIZING THE SAME

CROSS REFERENCE TO RELATED APPLICATIONS

This application claims the benefit of U.S. Provisional Application No. 61/993,576 filed 2014 May 15 and entitled "Efficient Transmission Beam Training Method for Wireless Systems", the entire contents of which are hereby incorporated by reference.

BACKGROUND OF THE INVENTION

Field of the Invention

The invention relates to methods for efficient beam training, and more particularly to methods for one-to-many hierarchical beam training.

Description of the Related Art

The term "wireless" normally refers to an electrical or electronic operation that is accomplished without the use of a "hard wired" connection. "Wireless communications" is the transfer of information over a distance without the use of electrical conductors or wires. The distances involved may be short (a few meters for television remote controls) or very long (thousands or even millions of kilometers for radio communications). The best known example of wireless communications is the cellular telephone. Cellular telephones use radio waves to enable an operator to make phone calls to another party from many locations worldwide. They can be used anywhere, as long as there is a cellular telephone site to house equipment that can transmit and receive signals, which are processed to transfer both voice and data to and from the cellular telephones.

There are various well-developed and well-defined cellular communications radio access technologies (RATs). For example, the Global System for Mobile communications (GSM) is a well-defined and commonly adopted communications system, which uses time division multiple access (TDMA) technology, which is a multiplex access scheme for digital radio, to send voice, data, and signalling data (such as a dialed telephone number) between mobile phones and cell sites. The CDMA2000 is a hybrid mobile communications 2.5G/3G (generation) technology standard that uses code division multiple access (CDMA) technology. The UMTS (Universal Mobile Telecommunications System) is a 3G mobile communications system, which provides an enhanced range of multimedia services over the GSM system. Wireless Fidelity (Wi-Fi) is a technology defined by the 802.11 engineering standard and can be used for home networks, mobile phones, and video games, to provide a high-frequency wireless local area network. The LTE (Long Term Evolution) and the LTE-Advanced evolved from the LTE are the 4G mobile communications systems, which provide high-speed data transmission over 2G and 3G systems.

The millimeter-wave band has the available spectrum and is capable of providing significantly higher-level throughputs than the microwave frequency band. Due to significantly higher attenuation levels and the directional nature of millimeter-wave signals, millimeter-wave devices (i.e., stations) generally employ highly-directional antennas as well as beamforming techniques for communicating.

Beamforming is a signal processing technique which allows to combine signals received from multiple antenna branches for special purpose, e.g., for SINR maximizing or for interference suppression.

By analog beamforming, the signal combination is performed in analog domain (before ADC) and is usually less flexible. The combined signal passes through ADC and at the digital domain, there is simply one branch of signal.

As for digital beamforming, the signal combination takes place in digital domain. For this to happen, the signals received from individual antenna branches go through individual ADC. With this approach, it is more flexible as we have multiple signals in digital domain for us to play with. However, in order to achieve this, it requires multiple processing chains in order to convert analog signals to digital domain. For example, multiple ADC is needed.

BRIEF SUMMARY OF THE INVENTION

A network control device and methods for efficient beam training are provided. An exemplary embodiment of a network control device comprises a wireless communications module and a controller. The wireless communications module receives a plurality of first signals. Each first signal comprises information regarding a preferred transmitting beam in a first beam level determined by a communications apparatus. The controller selects a group of communications apparatuses to join a 1-to-many beam training according to the received first signals and selecting one or more transmitting beams in a second beam level to be trained from a plurality of transmitting beams supported by the wireless communications module. The communications apparatuses in the group have the same preferred transmitting beam in the first beam level and the transmitting beam(s) in the second beam level associates with the preferred transmitting beam in the first beam level. The wireless communications module further uses the transmitting beam(s) in the second beam level in turn to transmit signals to the group of communications apparatuses to perform the 1-to-many beam training for training the transmitting beam(s) in the second beam level among the group of communications apparatuses at the same time.

An exemplary embodiment of a method for efficient beam training comprises: selecting a group of communications apparatuses to join a 1-to-many beam training according to a plurality of first signals, wherein the first signals are received from a plurality of communications apparatus and each first signal comprises information regarding a preferred transmitting beam determined by a communications apparatus; selecting one or more transmitting beams to be trained from a plurality of transmitting beams supported by a network control device; and using the transmitting beam(s) in turn to transmit signals to the group of communications apparatuses to perform the 1-to-many beam training for training the transmitting beam(s) among the group of communications apparatuses at the same time. The communications apparatuses in the group have the same preferred transmitting beam, the preferred transmitting beam is in a first beam level and the transmitting beam(s) is/are in a second beam level, the transmitting beam(s) in the second beam level associates with the preferred transmitting beam in the first beam level, and the first beam level and the second beam level are hierarchical beam levels.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
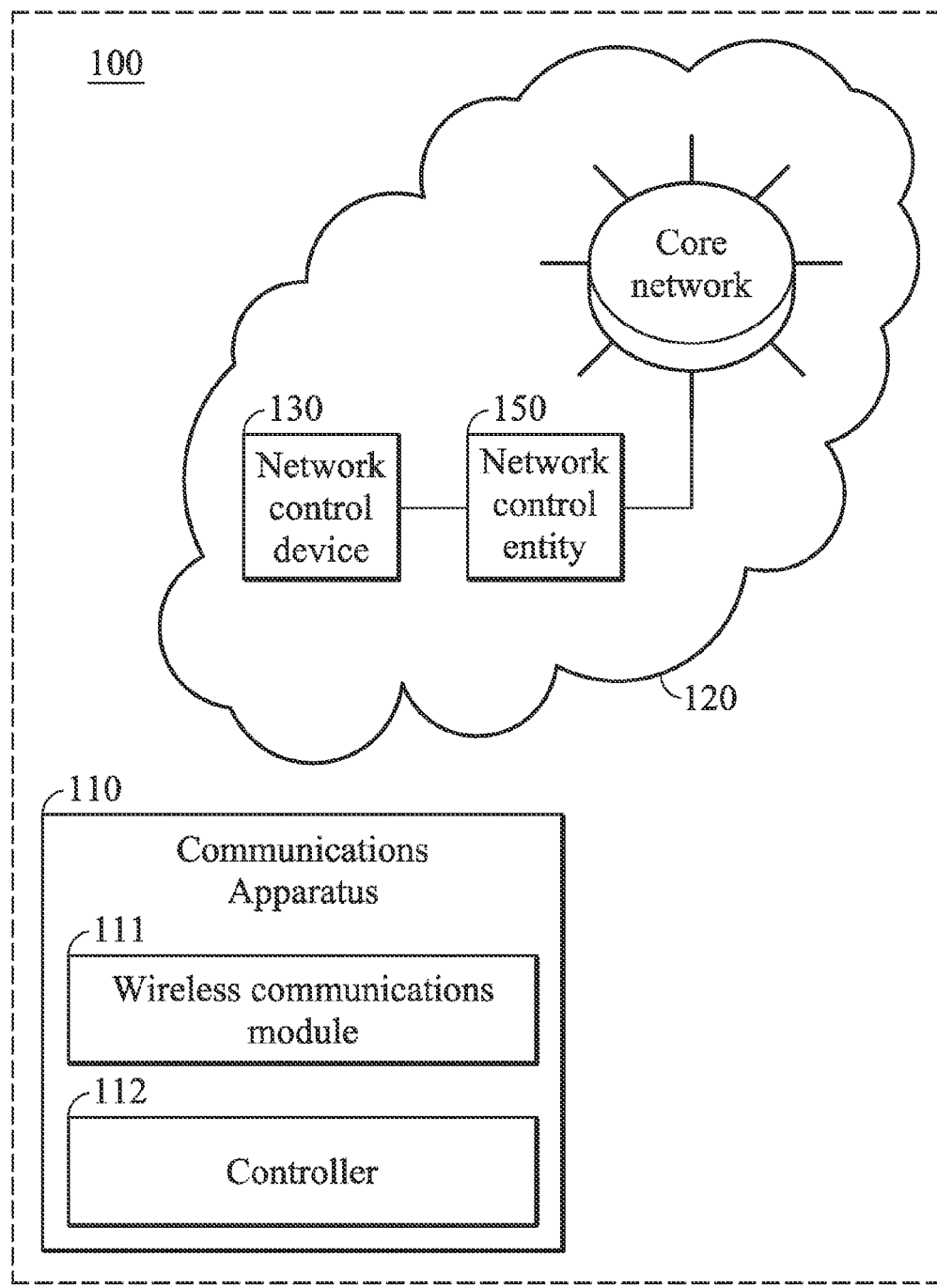
FIG. 1 is a block diagram illustrating a wireless communications system according to an embodiment of the invention.

FIG. 1 is a block diagram illustrating a wireless communications system according to an embodiment of the invention. In the wireless communications system 100, a communications apparatus 110 is wirelessly connected to a service network, such as the service network 120 shown in FIG. 1, for obtaining wireless communications services. Operations of the service network 120 are in compliance with a predetermined communications protocol. The service network 120 may comprise one or more network control devices, such as the network control device 130, interfacing between one or more communications apparatuses and the core network, for providing wireless communications services to the communications apparatus 110. The service network 120 may also comprise one or more intermediate control nodes, such as the network control entity 150 shown in FIG. 1, for controlling the operation of the one or more network control devices. In the embodiments of the invention, the network control entity may be a Base Station Controller (BSC), or may be realized in a distributed manner without a centralized controller, or may be a part of a base station's functionality, or the like.

In addition, according to an embodiment of the invention, the network control device 130 may be an evolved Node B (eNB), a Base Station (BS), a Base Station Controller (BSC), a Radio Network Controller (RNC), or the like. Note that in some embodiments of the invention, when the network control device is an eNB or a BS, the network control entity in the service network may be a BSC which can configure the network control devices.

According to an embodiment of the invention, the communications apparatus 110 may be a terminal node wirelessly connected to the service network, such as User Equipment (UE). The communications apparatus 110 may comprise at least a wireless communications module 111 for performing the functionality of wireless transmission and reception to and from the service network 120. To further clarify, the wireless communications module 111 may comprise at least a baseband signal processing device (not shown in FIG. 1) and a front-end signal processing device (not shown in FIG. 1). The baseband signal processing device may comprise multiple hardware devices to perform baseband signal processing, including Analog-to-Digital Conversion (ADC)/Digital-to-Analog Conversion (DAC), gain adjusting, modulation/demodulation, encoding/decoding, and so on. The front-end signal processing device may receive RF signals, process the RF signals, and convert the RF signals to baseband signals, which are to be processed by the baseband signal processing device, or receive baseband signals from the baseband signal processing device, convert the received baseband signals to RF signals and process RF signals which are later transmitted. The front-end signal processing device may also comprise multiple hardware devices to perform radio frequency conversion and RF signal processing. For example, the front-end signal processing device may comprise a mixer to multiply the baseband signals with a carrier oscillated in the radio frequency of the wireless communications system, where the radio frequency depends on the Radio Access Technology (RAT) in use. Also, the communications apparatus 110 may comprise a controller 112 for controlling the operation of the wireless communications module 111 and functional components (not shown) such as a display unit and/or keypad serving as the MMI (man-machine interface), a storage unit storing data and program codes of applications or communications protocols, and other functional components.

Note that in order to clarify the concept of the invention, FIG. 1 presents a simplified block diagram, in which only the elements relevant to the invention are shown. Therefore, the invention should not be limited to what is shown on the FIG. 1.

Figure 2:
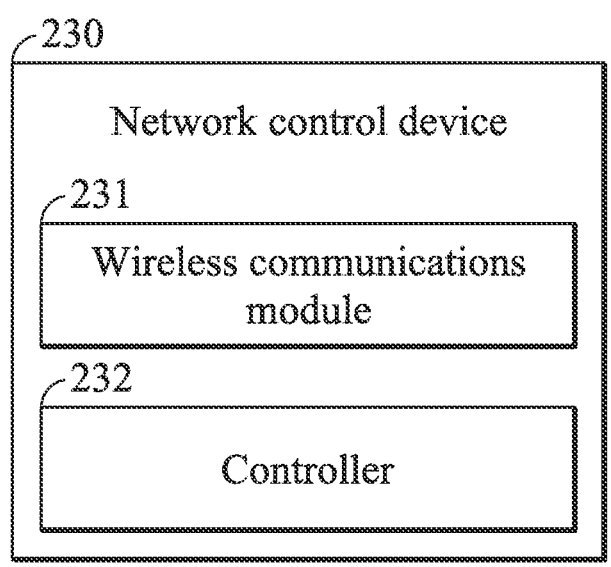
FIG. 2 shows a simplified block diagram of a network control device in the service network according to an embodiment of the invention.

FIG. 2 shows a simplified block diagram of a network control device in the service network according to an embodiment of the invention. According to an embodiment of the invention, the network control device may be an evolved Node B (eNB), a Base Station (BS), a Base Station Controller (BSC), a Radio Network Controller (RNC), or the like, and may also be regarded as a communications apparatus for providing wireless communications services in the service network. The network control device 230 may also comprise at least a wireless communications module 231 for performing the functionality of wireless transmission and reception between the core network and one or more peer devices, such as the communications apparatus 110 shown in FIG. 1. To further clarify, the wireless communications module 231 may comprise a baseband signal processing device (not shown in FIG. 2) and a front-end signal processing device (not shown in FIG. 2). The baseband signal processing device may comprise multiple hardware devices to perform baseband signal processing, including Analog-to-Digital Conversion (ADC)/Digital-to-Analog Conversion (DAC), gain adjusting, modulation/demodulation, encoding/decoding, and so on. The front-end signal processing device may receive RF signals, process the RF signals, and convert the RF signals to baseband signals, which are to be processed by the baseband signal processing device, or receive baseband signals from the baseband signal processing device, convert the received baseband signals to RF signals and process RF signals which are later transmitted. The front-end signal processing device may also comprise multiple hardware devices to perform radio frequency conversion. For example, the front-end signal processing device may comprise a mixer to multiply the baseband signals with a carrier oscillated in the radio frequency of the wireless communications system, where the radio frequency depends on the RAT in use. Also, the network control device 230 may comprise a controller 232 for controlling the operation of the wireless communications module 231 and other functional components (not shown), such as a storage unit storing data and program codes of applications or communications protocols, or others.

Note that in order to clarify the concept of the invention, FIG. 2 presents a simplified block diagram, in which only the elements relevant to the invention are shown. Therefore, the invention should not be limited to what is shown on the FIG. 2.

According to an embodiment of the invention, at least one of the network control device (e.g. the network control device 130/230) and the communications apparatus (e.g. the communications apparatus 110) may comprise an antenna array which comprises a plurality of antenna elements for supporting analog-array beamforming. Analog-array beamforming is good for signal transmission and/or reception in a wireless communications system. To be more specific, the analog-array beamforming may provide array gain for compensating for severe path loss due to a harsh wireless propagation environment, and may remove the needs for training a channel response matrix between multiple antenna elements at transmitter (TX)/receiver (RX) sides.

Figure 3A:
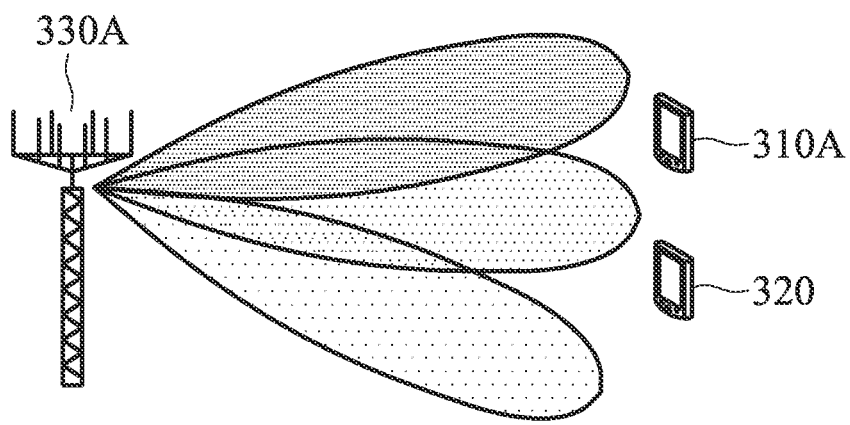
FIG. 3A is a schematic diagram showing an exemplary wireless communications system with at least a network control device supporting analog-array beamforming according to an embodiment of the invention.

FIG. 3A is a schematic diagram showing an exemplary wireless communications system with at least a network control device supporting analog-array beamforming according to an embodiment of the invention. As shown in FIG. 3A, the network control device 330A may be an eNB or a BS, and may be capable of generating a plurality of transmitting (TX) beams with different orientations and/or directing to different directions (angles). The communications apparatuses 310A and 320 may be the UEs and may respectively receive the same or different TX beams to obtain better array gain for data transmission.

Figure 3B:
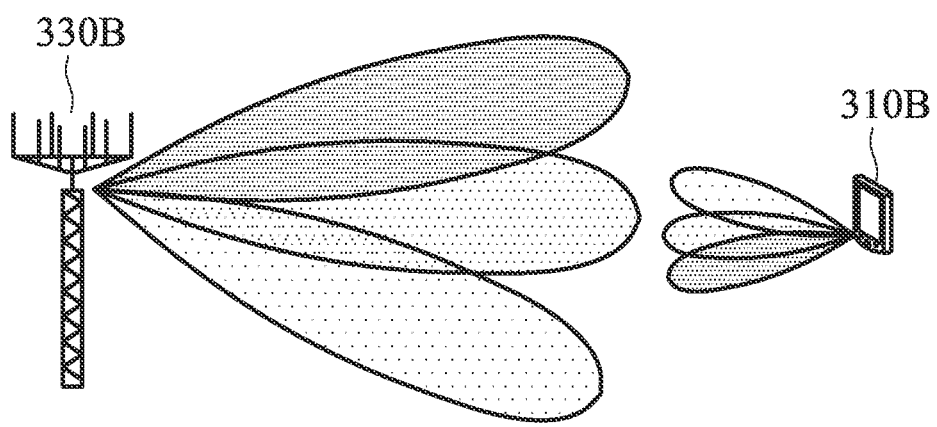
FIG. 3B is a schematic diagram showing another exemplary wireless communications system in which both the network control device and the communications apparatus support analog-array beamforming according to another embodiment of the invention.

FIG. 3B is a schematic diagram showing another exemplary wireless communications system in which both the network control device and the communications apparatus support analog-array beamforming according to another embodiment of the invention. As shown in FIG. 3B, the network control device 330B may be an eNB or a BS, and may be capable of generating a plurality of TX beams with different orientations and/or directing to different directions (angles). The communications apparatus 310B may be the UE and may be also capable of generating a plurality of TX beams with different orientations and/or directing to different directions (angles).

Generally, in cases when only the network control device supports analog-array beamforming, the TX beam training for the network control device (is required. In addition, for the case when both the network control device and the communications apparatus support analog-array beamforming, the TX beam training and RX beam training for the network control device and the communications apparatus are required. However, to select a proper transmitting beam from a large candidate set is resource-consuming if an exhaustive search is used. The complexity is further increased when both the TX beam training and RX beam training are required. Thus, efficient beam training methods are proposed in the following paragraphs.

Figure 4:
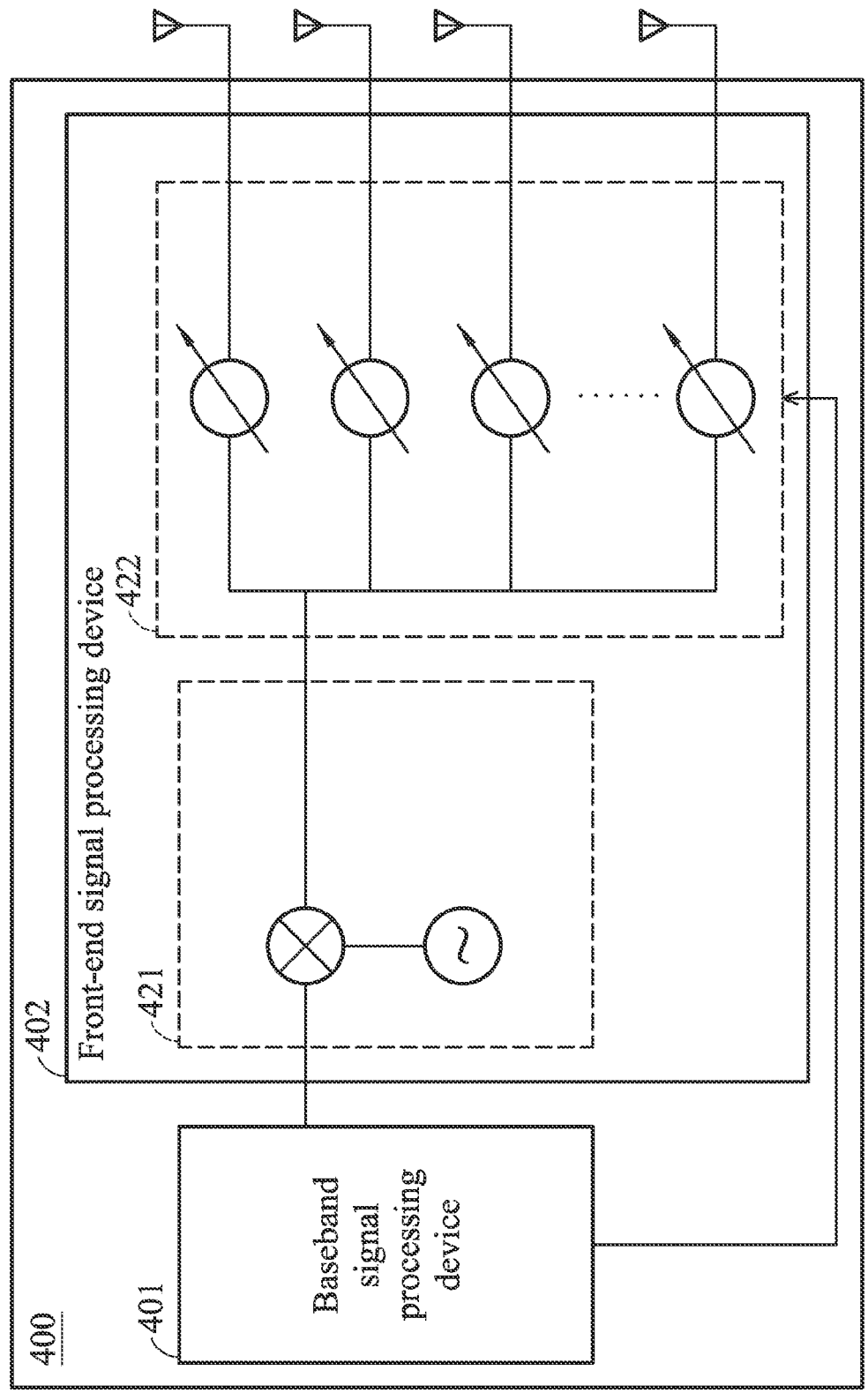
FIG. 4 shows an exemplary block diagram of a wireless communications module according to an embodiment of the invention.

FIG. 4 shows an exemplary block diagram of a wireless communications module according to an embodiment of the invention. The wireless communications module 400 may be the wireless communications module comprised in the communications apparatus and/or the network control device (note that in the embodiments of the invention, the network control device may also be regarded as a communications apparatus for providing wireless communications services in the service network). The wireless communications module 400 may comprise a baseband signal processing device 401 and a front-end signal processing device 402. As described above, the baseband signal processing device 401 may comprise multiple hardware devices to perform baseband signal processing, including Analog-to-Digital Conversion (ADC)/Digital-to-Analog Conversion (DAC), gain adjusting, modulation/demodulation, encoding/decoding, and so on. According to an embodiment of the invention, the baseband signal processing device 401 may also comprise a processor (not shown in FIG. 4) for controlling operations of the hardware devices. Note that in some embodiments of the invention, the devices for performing ADC and DAC may also be removed to the outside of the baseband signal processing device 401 and configured between the baseband signal processing device 401 and the front-end signal processing device 402, or they may be configured inside of the front-end signal processing device 402, and the invention should not be limited to any specific method of implementation.

The front-end signal processing device 402 may comprise a Radio Frequency (RF) signal processing module 421 and a phase controller 422. The RF signal processing module 421 may also comprise a plurality of hardware devices to perform radio frequency conversion and RF signal processing. For example, as shown in FIG. 4, the RF signal processing module 421 may comprise at least a mixer and an oscillator to perform radio frequency conversion. The phase controller 422 may comprise a plurality of paths, each being coupled to a corresponding antenna element and comprising at least a phase adjustor for adjusting the phase of the corresponding RF signal to be transmitted and/or adjusting the phase (or angle) of the corresponding antenna element. According to an embodiment of the invention, the phase adjustors may be controlled by the baseband signal processing device 401, such as the processor comprised in the baseband signal processing device 401. Note that in some embodiments of the invention, the RF signal processing module 421 may also be designed to comprise a plurality of signal processing chains, each corresponding to one transceiver chain and comprising a plurality of hardware devices to perform radio frequency conversion and RF signal processing as shown in FIG. 4, and the invention should not be limited to any specific method of implementation.

Note further that in some embodiments of the invention, the processor comprised in the baseband signal processing device may also control operations of the whole of the wireless communications module, or, in some embodiments of the invention, the controller 112/232 and the processor controlling operations of the hardware devices of the baseband signal processing device may also be integrated together as one controller or processor. There may still be plenty of different designs, and the invention should not be limited to any specific method of implementation.

Note further that, in order to clarify the concept of the invention, FIG. 4 presents a simplified block diagram, in which only the elements relevant to the invention are shown. Therefore, the invention should not be limited to what is shown in FIG. 4.

Figure 5:
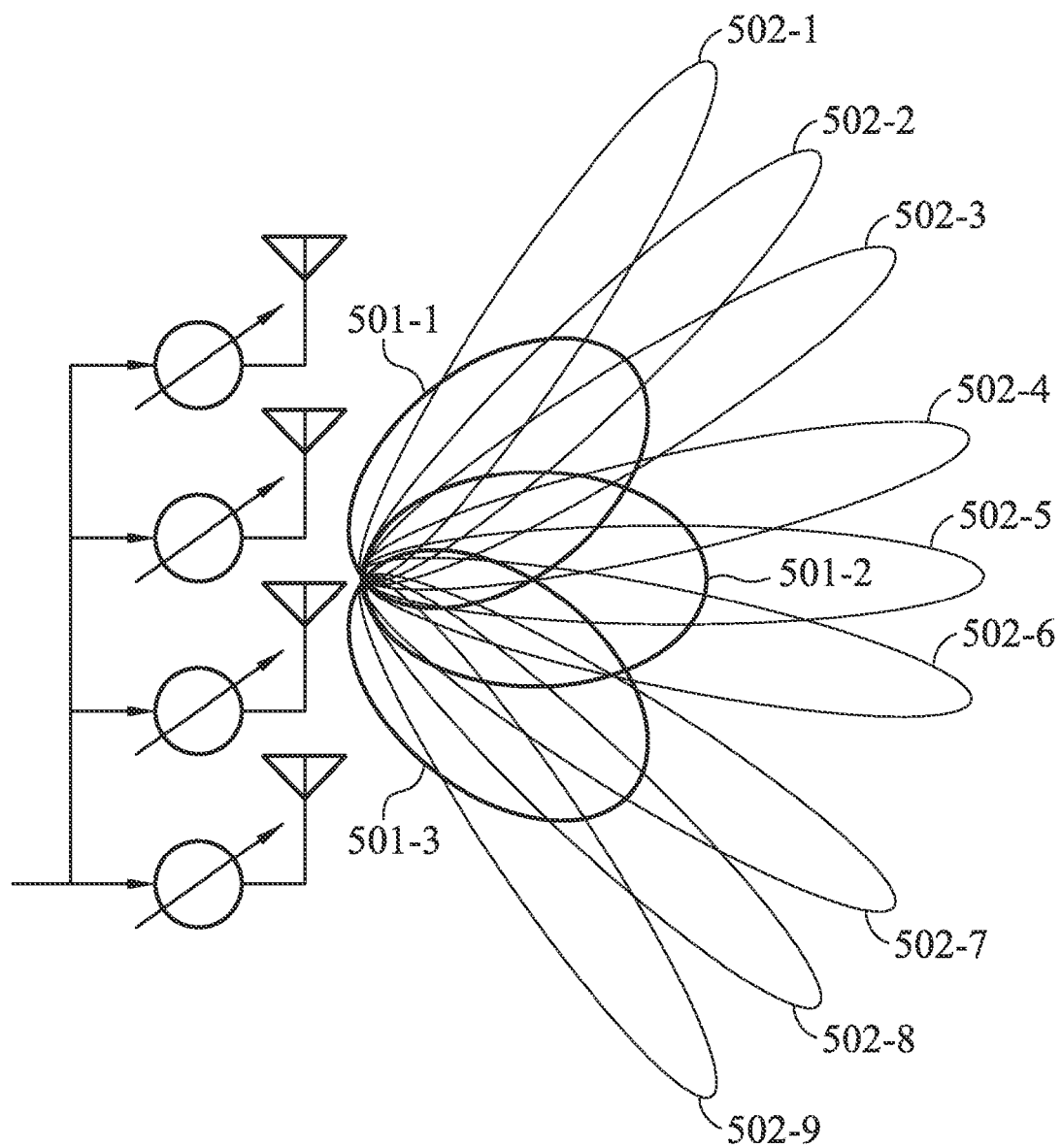
FIG. 5 shows a plurality of exemplary TX beams transmitted by a network control device or a communications apparatus according to an embodiment of the invention.

FIG. 5 shows a plurality of exemplary TX beams transmitted by a network control device or a communications apparatus according to an embodiment of the invention. According to an embodiment of the invention, the network control device and/or the communications apparatus supporting analog-array beamforming may be able to generate multi-level beams. As shown in FIG. 5, the beams 501-1~501-3 may belong to a first beam level Level 1, and the beams 502-1~502-9 may belong to a second beam level Level 2. Note that in an embodiment of the invention, only one beam can be formed at a time for transmission or reception, if there is only one RF transceiver.

According to an embodiment of the invention, the beams in different beam levels may have different spatial resolutions, which are also called the beam resolutions. In addition, the beams in different beam levels may have different beam widths. Each beam level may have a corresponding beam resolution. The beam resolutions may be distributed in an ascending or descending order, depending on the starting beam level. In addition, the beams with finer beam resolution may have higher array gain, and the beams with coarser beam resolution may have smaller array gain. For example, since the beam width of the beams 501-1~501-3 belonging to the first beam level Level 1 is wider than the beam width of the beams 502-1~502-9 belonging to the second beam level Level 2, the beam resolution of the beams 501-1~501-3 is coarser than the beam resolution of the beams 502-1~502-9 and the array gain of the beams 502-1~502-9 is higher than the array gain of the beams 501-1~501-3.

Figure 6:
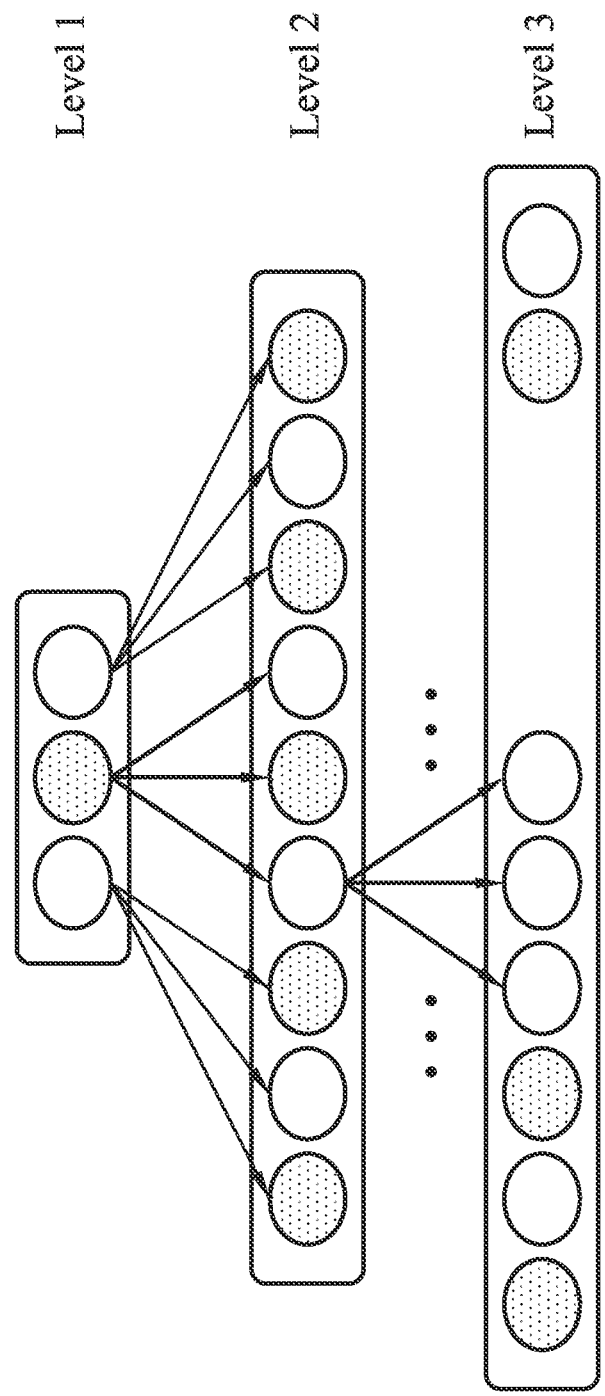
FIG. 6 is a schematic diagram illustrating the tree-like structure of the multi-level beams according to an embodiment of the invention.

In addition, according to an embodiment of the invention, the beam levels may be hierarchical beam levels. FIG. 6 is a schematic diagram illustrating a tree-like structure of the multi-level beams according to an embodiment of the invention. In FIG. 6, each circle represents a beam. There are three beam levels shown in FIG. 6, including Level 1, Level 2 and Level 3. The beam levels Level 1, Level 2 and Level 3 are hierarchical beam levels, and the beam resolution and array gain of the beams in the hierarchical beam levels may be distributed in ascending order from the first beam level Level 1 to the third beam level Level 3. That is, the beam resolution of the beams in Level 2 is finer than the beam resolution of the beams in Level 1, and the beam resolution of the beams in Level 3 is finer than the beam resolution of the beams in Level 2. In addition, the array gain of the beams in Level 2 is higher than the array gain of the beams in Level 1, and the array gain of the beams in Level 3 is higher than the array gain of the beams in Level 2.

In addition, according to an embodiment of the invention, a beam in a certain beam level is associated (also called correlated) with several beams in the next level. Here, the term "associate" (also called "correlate") indicates an overlapping beam main pattern (that is, main-lobe of the beam) between two concerned beams. For example, as shown in FIG. 5, the beam 501-1 in the first beam level Level 1 is associated with the beams 502-1~502-3 in the second beam level Level 2. The angular coverage of the beam 501-1 is larger than and substantially covers the angular coverages of the beams 502-1~502-3, and the beam main pattern of the beam 501-1 is overlapped with the beam main patterns of the beams 502-1~502-3. In addition, the beam 501-2 in the first beam level Level 1 is associated with the beams 502-4~502-6 in the second beam level Level 2. The angular coverage of the beam 501-2 is larger than and substantially covers the angular coverages of the beams 502-4~502-6, and the beam main pattern of the beam 501-2 is overlapped with the beam main patterns of the beams 502-4~502-6. In addition, the beam 501-3 in the first beam level Level 1 is associated with the beams 502-7~502-9 in the second beam level Level 2. The angular coverage of the beam 501-3 is larger than and substantially covers the angular coverages of the beams 502-7~502-9, and the beam main pattern of the beam 501-3 is overlapped with the beam main patterns of the beams 502-7~502-9. In addition, in an embodiment of the invention, aggregated angular coverage of the beams in the second beam level Level 2 is preferably the same as that of the first beam level Level 1. The beam association characteristic is also shown in FIG. 6.

Figure 7:
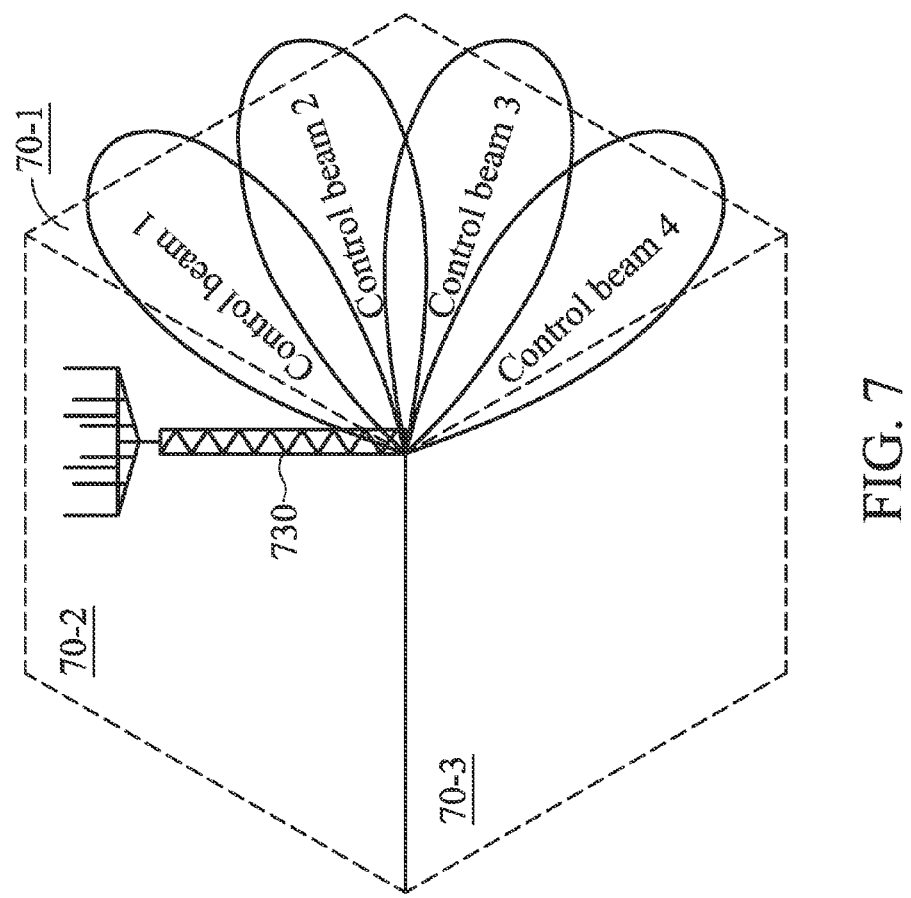
FIG. 7 is a schematic diagram showing system assumptions according to an embodiment of the invention.

FIG. 7 is a schematic diagram showing system assumptions according to an embodiment of the invention. In the embodiments of the invention, it is assumed that the network control device (such as an eNB, BS, or the like) 730 has no knowledge of the antenna array capability of the communications apparatus (such as UE under its coverage and using its services). The network control device 730 may comprise three sectors (also called cells) 70-1, 70-2 and 70-3. At least one sector, such as the sector 70-1, is served by a manageable number of control beams (such as the control beam 1~control beam 4 shown in FIG. 7). The network control device 730 may use the control beams to transmit control signals, training sequences and/or reference signals. Therefore, the control beams are utilized to serve control channels of the network control device 730. The control signals may comprise basic information for initial system access. For example, the control signals may comprise information for the communications apparatus to synchronize and communicate with the network control device 730. The training sequences may be utilized for beam training.

Note that in the embodiments of the invention, array reciprocity is applied. That is, the TX beams of the network control device are equivalent to the RX beams of the network control device. Similarly, the TX beams of the communications apparatus are equivalent to the RX beams of the communications apparatus. Therefore, a beam (including the control beam of the network control device) of the network control device may be utilized for both downlink transmission and uplink reception, and a beam of the communications apparatus may be utilized for both downlink reception and uplink transmission.

Note further that in the embodiments of the invention, it is assumed that the control beams of the network control device are the beams with the coarsest beam resolution and widest beam width among all the beams supported by the network control device. Therefore, the control beams have the widest angular coverage among all the beams supported by the network control device. In addition, it should be noted that in the embodiments of the invention, the angular coverage of a control beam is smaller than one sector as shown in FIG. 7.

Note further that in the embodiments of invention, the sequential training sequences may be transmitted in a transmission by transmission manner. In addition, in the embodiments of the invention, 1-to-many beam training is achieved such that the network control device may be able to train a plurality of communications apparatuses in a beam training procedure to achieve the goal of efficient beam training.

In the following paragraphs, methods for 1-to-many hierarchical beam training are proposed, in which the beams with coarser beam resolution are trained first. After that, the beams with finer beam resolution are selected based on the previous training results and are trained further. The training results may be obtained by calculating a decision metric. For example, the trainee side may pre-store a set of candidate training sequences. Each candidate training sequence may correspond to a specific TX/RX beam of the trainer. After receiving the training sequence carried in a specific TX/RX beam from the trainer side, the trainee may calculate a correlation between the received training sequence and each candidate training sequence in the set of candidate training sequences to generate the decision metric. The trainee may further determine an optimum candidate training sequence having the highest (and high enough) correlation with the received training sequence from the decision metric and find out the TX/RX beam of the trainer corresponding to the optimum candidate training sequence. Thereby the training result is obtained. The beam training procedure may be continuously performed level-by-level until a satisfactory array gain is obtained.

Note that in the embodiments of the invention, the trainer represents the one transmitting the training sequence or transmitting any training signal, and the trainee represents the one receiving the training sequence or receiving any training signal. Note further that in some embodiments, the trainee may also transmit the decision metric to the trainer. The trainer may determine an optimum TX/RX beam according to the received decision metric.

Figure 8:
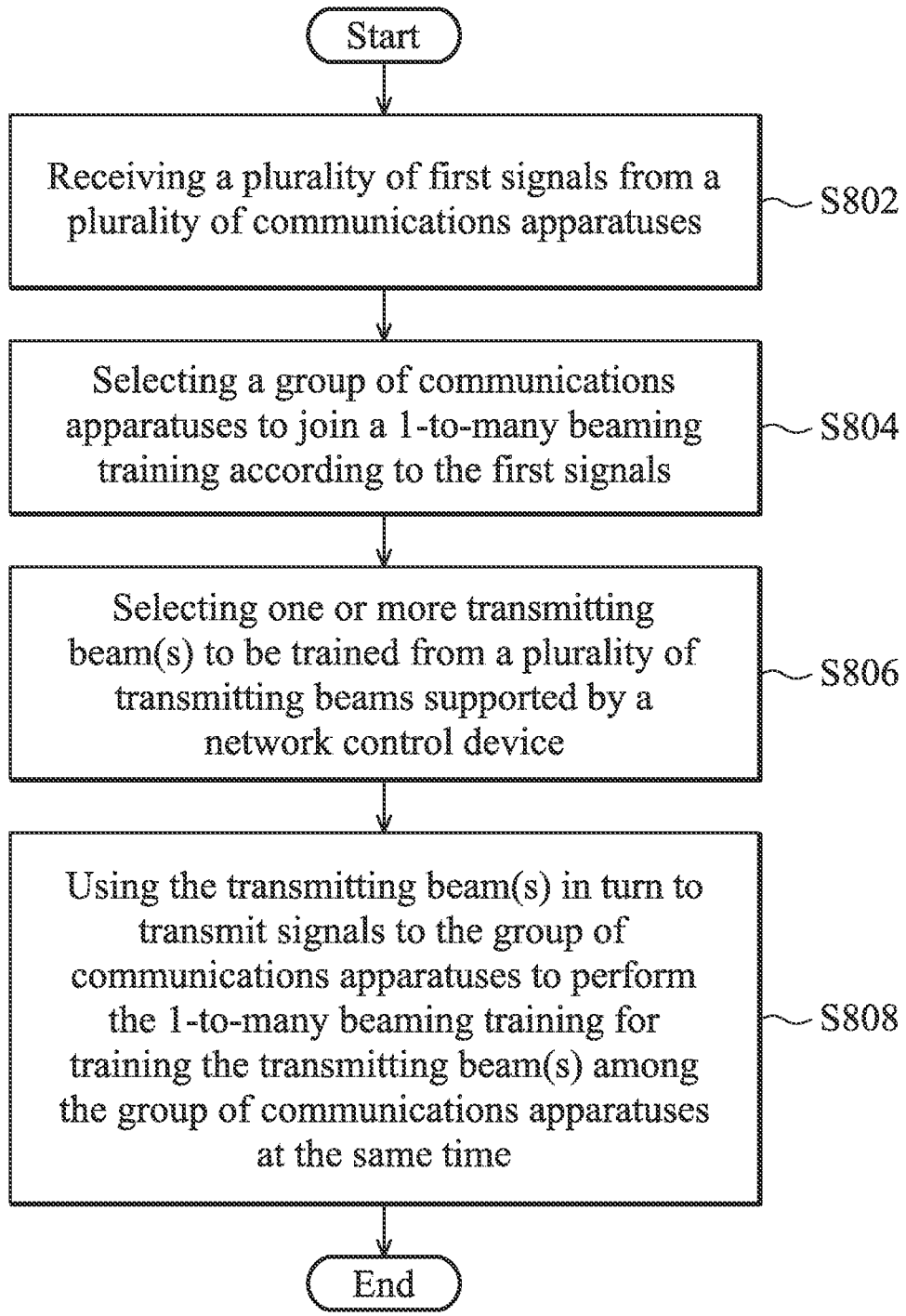
FIG. 8 shows a flow chart of a method for efficient beam training according to an embodiment of the invention.

FIG. 8 shows a flow chart of a method for efficient beam training according to an embodiment of the invention. In the embodiments of the invention, a network control device (that is, the trainer) may first transmit the training sequence or training signal via one or more beams with the coarsest or coarser beam resolution in a first beam level to a plurality of communications apparatuses, so as to train the one or more beams with the coarsest or coarser beam resolution in the first beam level. As discussed above, after receiving the training sequence or training signal, the communications apparatus (that is, the trainees) may calculate correlation between the received training sequence(s) and each candidate training sequence to generate one or more decision metric(s). The communications apparatus may further determine a preferred transmitting beam having the highest (and high enough) correlation based on the decision metric(s) to obtain a training result, and feedback information regarding the preferred transmitting beam to the network control device. Note that as discussed above, the communications apparatus may also feedback information regarding the decision metric(s) as the training result to the network control device for the network control device to determine the preferred transmitting beam thereof according to the received decision metric(s), and the invention should not be limited thereto.

Therefore, referring to FIG. 8, according to an embodiment of the invention, the network control device may receive a plurality of first signals from a plurality of communications apparatuses (Step S802). Each first signal may comprise information regarding a preferred transmitting beam in a first beam level determined by one communications apparatus. Note that the reception of first signals from different communications apparatuses may be performed at different time, as long as the training of the coarsest or coarser transmitting beam(s) in a first beam level is still valid.

Next, the network control device may select a group of communications apparatuses to join a 1-to-many beam training according to the training results carried in the first signals (Step S804). As discussed above, the training result may be the decision metric(s) calculated by a corresponding communications apparatus, or the preferred transmitting beam determined by the corresponding communications. In addition, according to the embodiment of the invention, the network control device may select communications apparatuses determining or having the same preferred transmitting beam as the group of communications apparatuses to join the 1-to-many beam training.

Next, the network control device may select one or more transmitting beams to be trained from a plurality of transmitting beams supported by itself (Step S806). In the embodiment of the invention, the network control device is able to generate multi-level beams, and the beam levels may be hierarchical beam levels as discussed above. For example, the network control device is able to generate multi-level beams based on a multi-level codebook. In the embodiments of the invention, the multi-level codebook may record a plurality of pre-defined settings for setting the antenna array to generate a multi-level beam pattern. For example, the multi-level codebook may be an orthogonal matrix, such as a discrete Fourier matrix, a Hadamard matrix, or another type of orthogonal matrix. Therefore, each setting in the multi-level codebook may correspond to a predetermined TX/RX beam. In addition, in the embodiment of the invention, the transmitting beam(s) in the second beam level associates with the preferred transmitting beam in the first beam level.

Next, the network control device may use the transmitting beam(s) in turn to transmit signals to the group of communications apparatuses to perform the 1-to-many beam training for training the transmitting beam(s) in the second beam level among the group of communications apparatuses at the same time (Step S808).

According to an embodiment of the invention, the communications apparatuses selected in the group to join the 1-to-many beam training are basically located in the angular coverage of the same beam, that is, the preferred transmitting beam in the first level determined by these communications apparatuses. In addition, in the embodiment of the invention, since the transmitting beam(s) in the second beam level associates with the preferred transmitting beam in the first beam level, the transmitting beam(s) in the second beam level may have a beam main pattern that overlap with a beam main pattern of the preferred transmitting beam in the first beam level. In addition, in the embodiment of the invention, since the transmitting beam(s) in the second beam level associates with the preferred transmitting beam in the first beam level, the transmitting beam(s) in the second beam level may have a beam width narrower than a beam width of the preferred transmitting beam in the first beam level.

In addition, in the embodiment of the invention, since the transmitting beam(s) in the second beam level associates with the preferred transmitting beam in the first beam level, the transmitting beam(s) in the second beam level may have a beam resolution finer than a beam resolution of the preferred transmitting beam in the first beam level. In addition, in the embodiment of the invention, since the transmitting beam(s) in the second beam level associates with the preferred transmitting beam in the first beam level, the transmitting beam(s) in the second beam level may have an angular coverage smaller than an angular coverage of the preferred transmitting beam in the first beam level. In addition, in the embodiment of the invention, since the transmitting beam(s) in the second beam level associates with the preferred transmitting beam in the first beam level, the transmitting beam(s) in the second beam level may have an array gain higher than an array gain of the preferred transmitting beam in the first beam level.

Figure 9A:
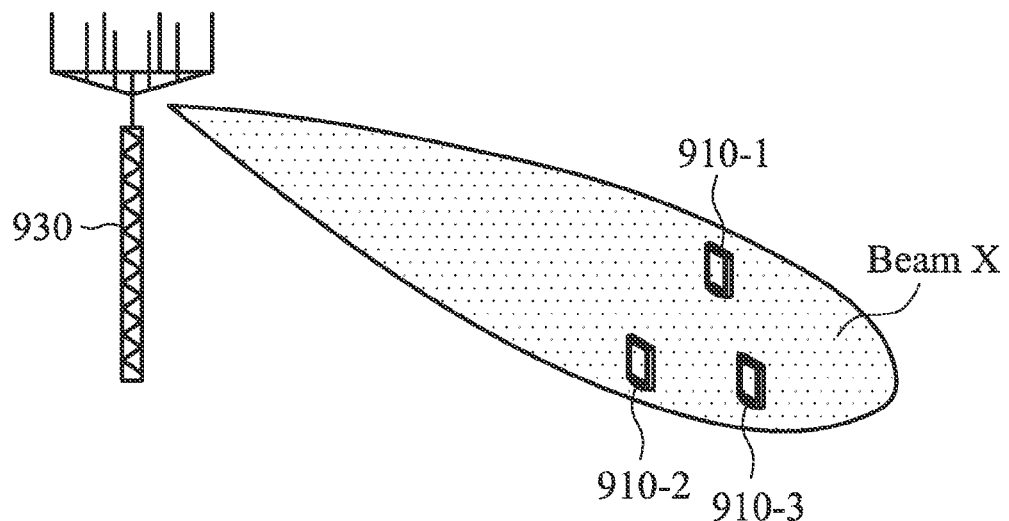
FIG. 9A and FIG. 9B show an exemplary scenario of 1-to-many beam training according to an embodiment of the invention.
Figure 9B:
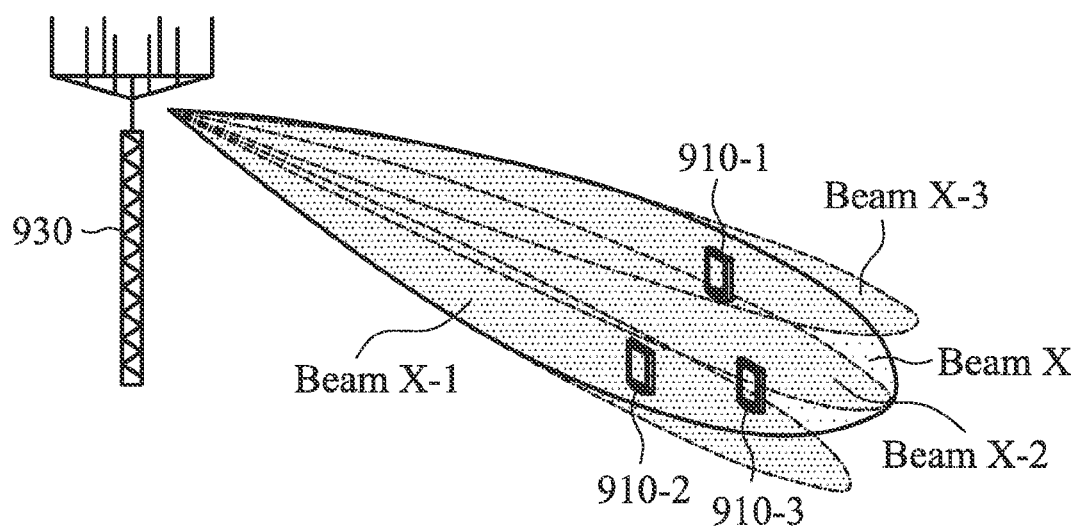

FIG. 9A and FIG. 9B show an exemplary scenario of 1-to-many beam training according to an embodiment of the invention. As shown in FIG. 9A, the network control device 930 may be an eNB or a BS, and may be capable of generating a plurality of beams with different orientations and/or directed at different directions (angles). The communications apparatuses 910-1, 910-2 and 910-3 may be the UEs. When the communications apparatuses 910-1, 910-2 and 910-3 all determine the same beam Beam X as their preferred transmitting beam in a first beam level, the network control device 930 may further select the communications apparatuses 910-1, 910-2 and 910-3 to join the 1-to-many beam training for training the transmitting beam(s) in a next level associating with the beam, Beam X, at the same time. As shown in FIG. 9B, the network control device 930 may train the transmitting beams X-1, X-2 and X-3 among the communications apparatuses 910-1, 910-2 and 910-3 at the same time, so as to share the training resources among the communications apparatuses 910-1, 910-2 and 910-3 and reduce the system overhead as compared to performing individual beam training. Note that in the embodiment of the invention, the first beam level may have the coarsest beam resolution as the control beam of the network control device, or it may not have the coarsest beam resolution, and the invention should not be limited to any specific case.

Figure 10:
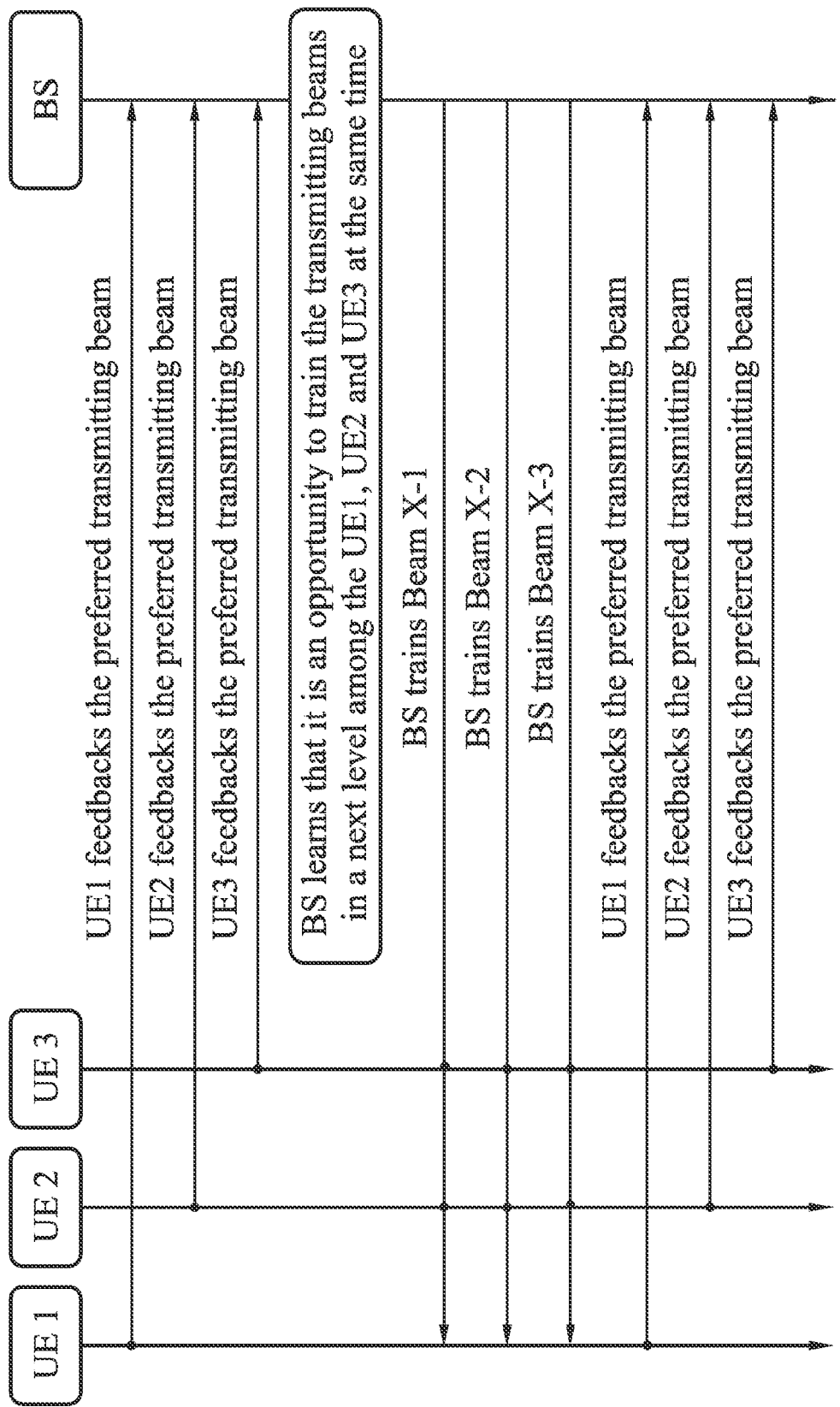
FIG. 10 is an exemplary flow chart showing the operations of the BS and the UEs joining the 1-to-many beam training according to an embodiment of the invention.

FIG. 10 is an exemplary flow chart showing the operations of the BS and the UEs joining the 1-to-many beam training according to an embodiment of the invention. Suppose that a plurality of communications apparatuses, such as the UE1, UE2 and UE3 shown in FIG. 10, respectively transmit a first signal to feed information regarding their preferred transmitting beam in a first beam level, such as the Beam X shown in FIG. 9A, back to the network control device, such as the BS shown in FIG. 10. Because the UE1, UE2 and UE3 all determine the same preferred transmitting beam, the BS may learn that it is an opportunity to train the transmitting beams in a next level among the UE1, UE2 and UE3 at the same time. Note that, in some embodiments of the invention, the 1-to-many beam training may also be triggered by the communications apparatuses, and the invention should not be limited thereto. For example, the communications apparatuses may send an explicit request or an implicit request to the network control device to indicate the desire for further training based on the preferred transmitting beam in the first beam level.

Next, the BS may transmit training sequence or training signal via the transmitting beams in the second beam level to be trained, such as the beams Beam X-1, X-2 and X-3 shown in FIG. 9B, in turn to the UE1, UE2 and UE3. The transmitting beams to be trained may be associated with the preferred transmitting beam determined in the first beam level. Upon receiving the training sequence or training signal, each UE may respectively transmit a second signal to feed information regarding their preferred transmitting beam in the currently trained beam level back to the BS, and the 1-to-many beam training procedure may be completed (or, the network control device may further begin another 1-to-many beam training procedure for a next beam level, such as a third beam level, and the invention should not be limited thereto). Take the exemplary scenario shown in FIG. 9B, the communications apparatuses 910-2 and 910-3 may determine the transmitting beam X-1 as their preferred transmitting beam in the currently trained beam level, and the communications apparatus 910-1 may determine the transmitting beam X-3 as its preferred transmitting beam in the currently trained beam level. Note that as discussed above, information regarding the preferred transmitting beam may be one or more detection metric(s) calculated by the corresponding communications apparatus, or may be the preferred transmitting beam determined by the corresponding communications apparatus.

According to an embodiment of the invention, the network control device may further transmit a resource allocation indication signal to the group of communications apparatuses joining the 1-to-many beam training to inform the group of communications apparatuses about resource allocation of the transmitting beam(s) to be trained. The network control device may transmit the resource allocation indication signal via a lower-layer signaling, so as to dynamically schedule the resource allocation, or via a higher-layer signaling, so as to semi-statically configure the resource allocation. In the embodiments of the invention, the resource allocation may be scheduled periodically or aperiodically.

According to an embodiment of the invention, the resources available to the transmitting beam may comprise at least the time interval in the time domain. Optionally, the resources for the transmitting beam may include more details, including the frequency band in the frequency domain, power, and the training sequence utilized for communications via the transmitting beam. Allocation of these resources to the various services may be pre-determined and understood by the communicating apparatuses, blindly detected by the communicating apparatuses, dynamically configured by the network control device and signaled to the communicating apparatuses as discussed above, or a semi-statically configured by the network control device and signaled to the communicating apparatuses by higher-layer protocol (for example, a RRC layer signaling) as discussed above.

Figure 11:
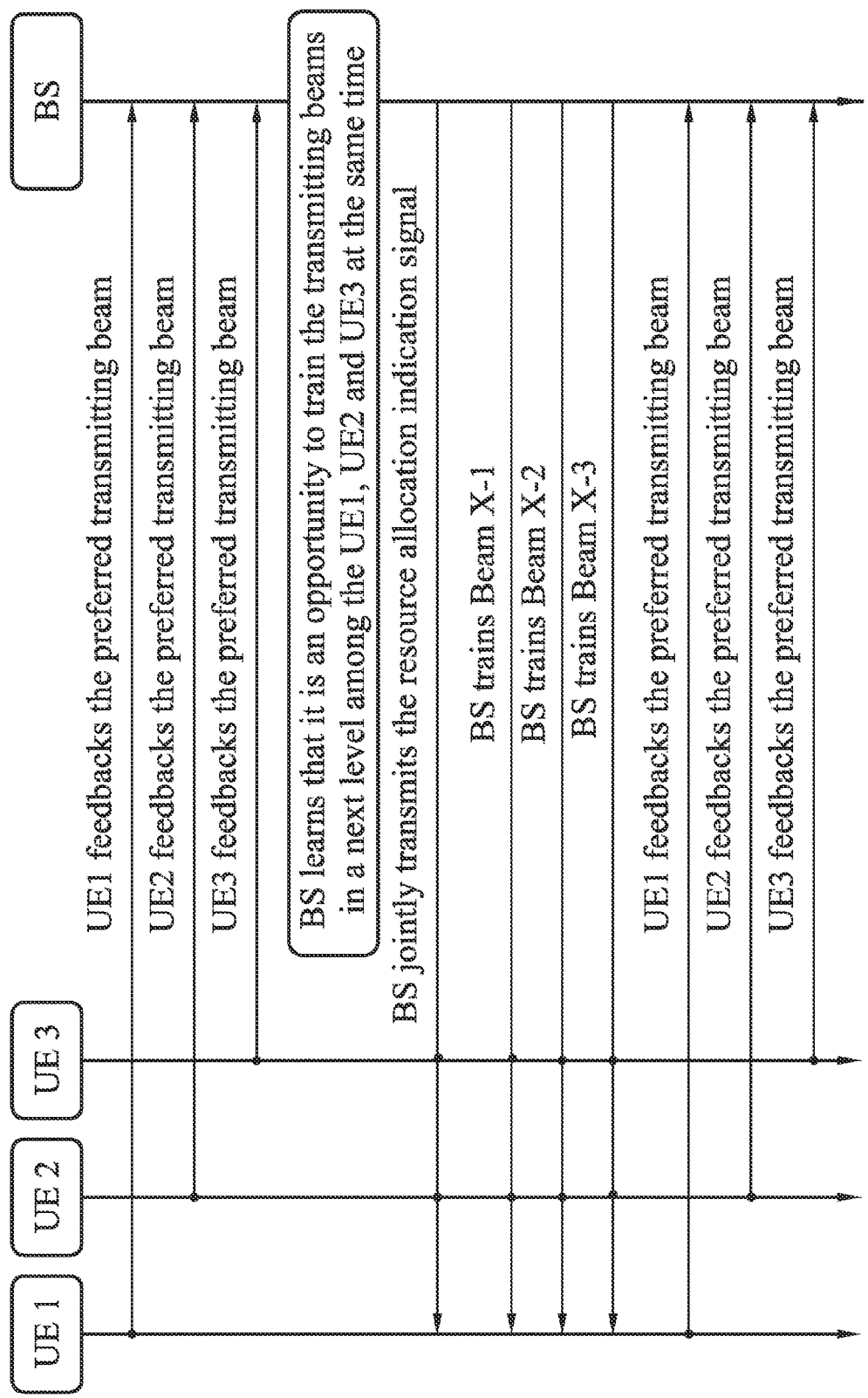
FIG. 11 is an exemplary flow chart showing the operations of the BS and the UEs joining the 1-to-many beam training according to another embodiment of the invention.

FIG. 11 is an exemplary flow chart showing the operations of the BS and the UEs joining the 1-to-many beam training according to another embodiment of the invention. The flow chart shown in FIG. 11 is similar to the one shown in FIG. 10. Therefore, for the descriptions of the same parts, reference may be made to FIG. 10 and are omitted here for brevity. The only difference between FIG. 10 and FIG. 11 is that, in FIG. 11, the network control device, such as the BS, may jointly transmit the resource allocation indication signal to the communications apparatuses, such as the UE1~UE3, before the training begins.

According to an embodiment of the invention, the network control device may broadcast the resource allocation indication signal by using the preferred transmitting beam in the first beam level, such as the Beam X shown in FIG. 9A, to inform the group of communications apparatuses about resource allocation of the transmitting beam(s) to be trained, such as the Beam X-1, Beam X-2 and Beam X-3 shown in FIG. 9B. Since the communications apparatuses, such as the UE1~UE3, are all located in the angular coverage of the same preferred transmitting beam, such as the Beam X shown in FIG. 9A, the communications apparatuses are supposed to be capable of receiving the broadcasted resource allocation indication signal. An example of the mentioned broadcast channel can be similar to the common Radio Resource Control (RRC) layer signaling in LTE systems.

According to another embodiment of the invention, the network control device may multicast the resource allocation indication signal to inform the group of communications apparatuses about resource allocation of the transmitting beam(s) to be trained, such as the Beam X-1, Beam X-2 and Beam X-3 shown in FIG. 9B. An example of such multicast channel can be a Physical Downlink Control Channel (PDCCH) that is addressed to an identifier that is recognized by the multicast group.

According to yet another embodiment of the invention, the network control device may unicast the resource allocation indication signal to each communications apparatus to inform about resource allocation of the transmitting beam(s) to be trained, such as the Beam X-1, Beam X-2 and Beam X-3 shown in FIG. 9B.

Figure 12:
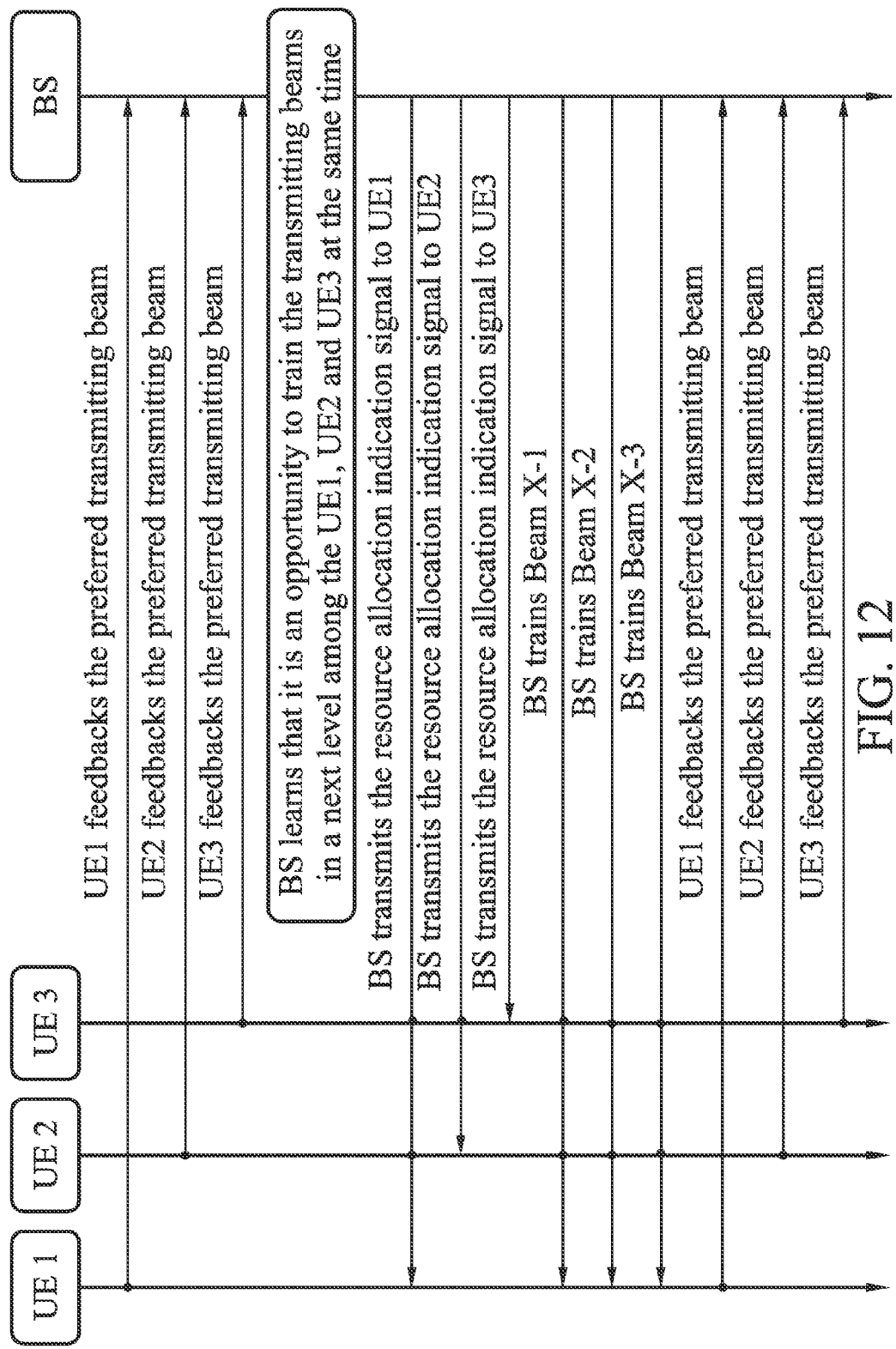
FIG. 12 is an exemplary flow chart showing the operations of the BS and the UEs joining the 1-to-many beam training according to yet another embodiment of the invention.

FIG. 12 is an exemplary flow chart showing the operations of the BS and the UEs joining the 1-to-many beam training according to the embodiment above with unicast resource allocation indication. The flow chart shown in FIG. 12 is similar to the one shown in FIG. 10. Therefore, for the descriptions of the same parts, reference may be made to FIG. 10 as they are omitted here for brevity. The only difference between FIG. 10 and FIG. 12 is that, in FIG. 12, the network control device, such as the BS, may individually transmit the resource allocation indication signal to each communications apparatus before the training begins.

In addition, according to an embodiment of the invention, the network control device may further determine whether to perform the 1-to-many beam training according to a number of communications apparatuses determined to have the same preferred transmitting beam in the first beam level. For example, when the number of communications apparatuses having the same preferred transmitting beam in the first beam level is less than a predetermined threshold, the network control device may determine not to perform the 1-to-many beam training.

In addition, according to an embodiment of the invention, the network control device may select the group of communications apparatuses to join the 1-to-many beam training further according to the request transmitted by the communications apparatus as discussed above.

In addition, according to an embodiment of the invention, the network control device may select the group of communications apparatuses to join the 1-to-many beam training further according to a mobility of the communications apparatuses.

Figure 13A:
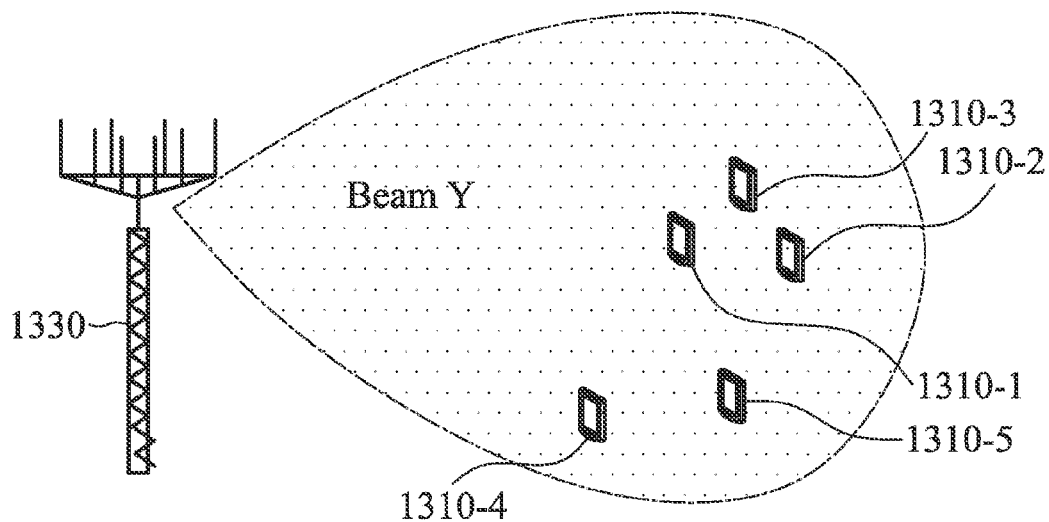
FIG. 13A, FIG. 13B and FIG. 13C show another exemplary scenario of 1-to-many beam training according to another embodiment of the invention.
Figure 13B:
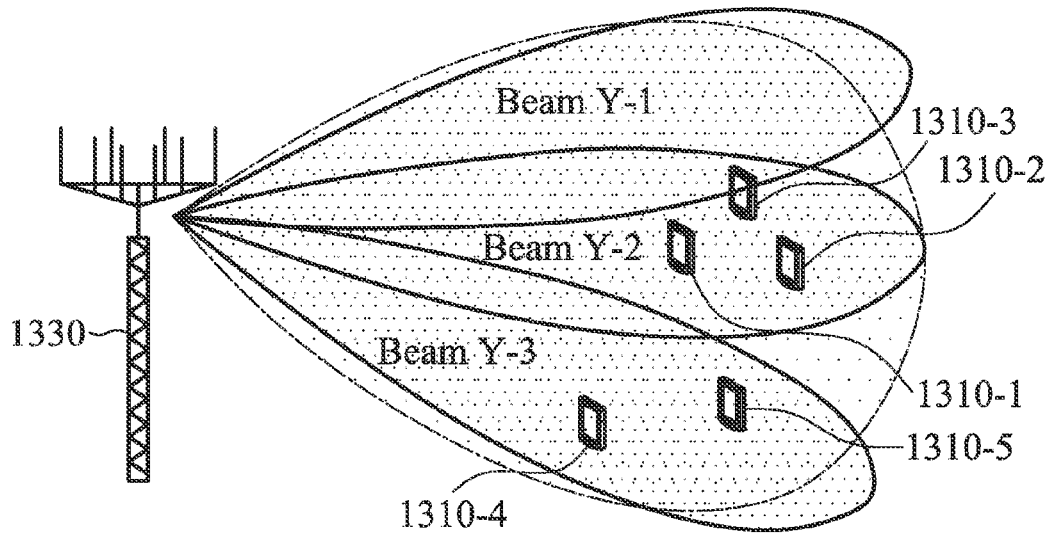
Figure 13C:
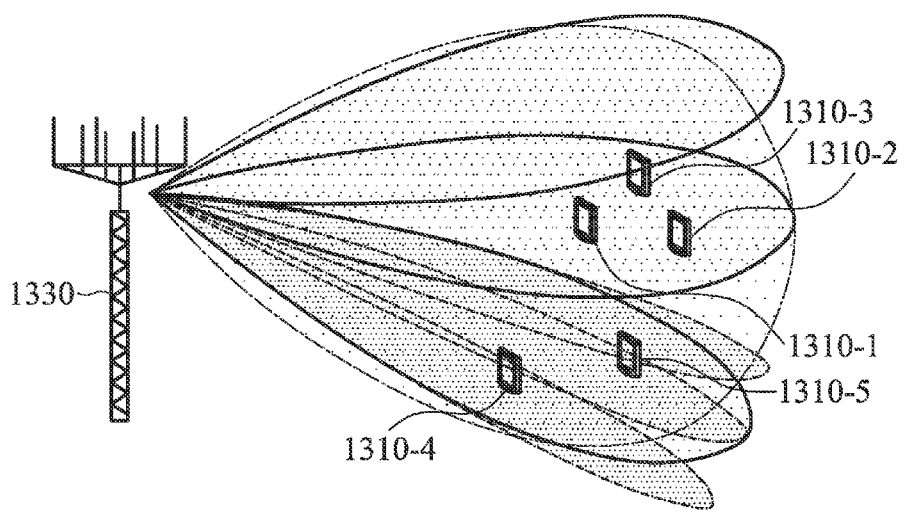

FIG. 13A, FIG. 13B and FIG. 13C show another exemplary scenario of 1-to-many beam training according to another embodiment of the invention. As shown in FIG. 13A, the network control device 1330 may be an eNB or a BS, and may be capable of generating a plurality of beams with different orientations and/or directing to different directions (angles). The communications apparatuses 1310-1, 1310-2, 1310-3, 1310-4 and 1310-5 may be the UEs. When the communications apparatuses 1310-1, 1310-2, 1310-3, 1310-4 and 1310-5 all determine the same beam, Beam Y, as their preferred transmitting beam in a first beam level, the network control device 1330 may further select the communications apparatuses 1310-1, 1310-2, 1310-3, 1310-4 and 1310-5 to join the 1-to-many beam training for training the transmitting beams Y-1, Y-2 and Y-3 in a next level associating with the beam Beam Y at the same time.

Next, as shown in FIG. 13B, the network control device 1330 may determine that there is no need to further train the finer transmitting beam(s) associating with the transmitting beam Y-1 since there is no communications apparatus located in its angular coverage. The network control device 1330 may determine that there is also no need to further train the finer transmitting beam(s) associating with the transmitting beam Y-2 among the communications apparatuses 1310-1, 1310-2 and 1310-3 since the communications apparatuses 1310-1, 1310-2 and 1310-3 all have high mobility (for example, moving at high speed). According to an embodiment of the invention, for high mobility communications apparatuses, coarser beams may be preferable.

In addition, as shown in FIG. 13C, the network control device 1330 may determine to further train the finer transmitting beam(s) associating with the transmitting beam Y-3 among the communications apparatuses 1310-4 and 1310-5 at the same time since the communications apparatuses 1310-4 and 1310-5 have low mobility.

Based on the proposed methods for 1-to-many hierarchical beam training illustrated in the above embodiments, the same training resource(s) is/are allowed to be shared among multi-users in an opportunistic manner. In addition, the time and system overhead required for beam training can be reduced as compared with the conventional UE specific individual beam training since the conventional UE specific individual beam training is resource consuming and may potentially suffer from unacceptable latency.

The embodiments of the present invention described above can be implemented in any of numerous ways. For example, the embodiments may be implemented using hardware, software or a combination thereof. It should be appreciated that any component or collection of components that perform the functions described above can be generically considered as one or more processors that control the discussed above function. The one or more processors can be implemented in numerous ways, such as with dedicated hardware, or with general-purpose hardware that is programmed using microcode or software to perform the functions recited above.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A network control device, comprising:
a wireless communications module, receiving a plurality of first signals, wherein each first signal comprises information regarding a preferred transmitting beam in a first beam level determined by a communications apparatus; and
a controller, selecting a group of communications apparatuses to join a 1-to-many beam training according to the received first signals and selecting one or more transmitting beams in a second beam level to be trained from a plurality of transmitting beams supported by the wireless communications module, wherein the group of communications apparatuses have the same preferred transmitting beam in the first beam level and the transmitting beam(s) in the second beam level associates with the preferred transmitting beam in the first beam level,
wherein the wireless communications module further uses the transmitting beam(s) in the second beam level in turn to transmit signals to the group of communications apparatuses to perform the 1-to-many beam training for training the transmitting beam(s) in the second beam level among the group of communications apparatuses at the same time.

2. The network control device as claimed in claim 1, wherein the transmitting beam(s) in the second beam level has/have a beam main pattern that is overlapped with a beam main pattern of the preferred transmitting beam in the first beam level.

3. The network control device as claimed in claim 1, wherein the transmitting beam(s) in the second beam level has/have a beam resolution finer than a beam resolution of the preferred transmitting beam in the first beam level.

4. The network control device as claimed in claim 1, wherein the wireless communications module further receives at least one second signal from at least one communications apparatus in the group of communications apparatuses, the second signal comprises information regarding one or more detection metric(s) calculated by the communications apparatus for the transmitting beam(s) in the second beam level, and wherein the controller further selects a preferred transmitting beam in the second beam level from the transmitting beam(s) in the second beam level according to the one or more detection metric(s) retrieved from the second signal.

5. The network control device as claimed in claim 1, wherein the wireless communications module further broadcasts a resource allocation indication signal by using the preferred transmitting beam in the first beam level to inform the group of communications apparatuses about resource allocation of the transmitting beam(s) to be trained.

6. The network control device as claimed in claim 5, wherein the resource allocation indication signal is sent via a higher layer channel that operates with same mechanism as for semi-static radio resource configurations.

7. The network control device as claimed in claim 1, wherein the wireless communications module further multicasts a resource allocation indication signal to the group of communications apparatuses to inform the group of communications apparatuses about resource allocation of the transmitting beam(s) to be trained.

8. The network control device as claimed in claim 7, wherein the resource allocation indication signal is sent via a physical layer control channel that operates with same mechanism as for physical resource dynamic scheduling.

9. The network control device as claimed in claim 1, wherein the wireless communications module further unicasts a resource allocation indication signal to each communications apparatus in the group of communications apparatuses to inform the group of communications apparatuses about resource allocation of the transmitting beam(s) to be trained.

10. The network control device as claimed in claim 1, wherein the controller further determines whether to perform the 1-to-many beam training according to a number of communications apparatuses having the same preferred transmitting beam in the first beam level.

11. The network control device as claimed in claim 1, wherein the controller selects the group of communications apparatuses to join the 1-to-many beam training further according to a mobility of the communications apparatuses having the same preferred transmitting beam in the first beam level.

12. A method for efficient beam training, comprising:
selecting a group of communications apparatuses to join a 1-to-many beam training according to a plurality of first signals, wherein the first signals are received from a plurality of communications apparatus and each first signal comprises information regarding a preferred transmitting beam determined by a communications apparatus;
selecting one or more transmitting beams to be trained from a plurality of transmitting beams supported by a network control device; and
using the transmitting beam(s) in turn to transmit signals to the group of communications apparatuses to perform the 1-to-many beam training for training the transmitting beam(s) among the group of communications apparatuses at the same time,
wherein the group of communications apparatuses have the same preferred transmitting beam, the preferred transmitting beam is in a first beam level and the transmitting beam(s) is/are in a second beam level, the transmitting beam(s) in the second beam level associates with the preferred transmitting beam in the first beam level, and the first beam level and the second beam level are hierarchical beam levels.

13. The method as claimed in claim 12, wherein the transmitting beam(s) in the second beam level has/have a beam main pattern that is overlapped with a beam main pattern of the preferred transmitting beam in the first beam level.

14. The method as claimed in claim 12, wherein the transmitting beam(s) in the second beam level has/have a beam resolution finer than a beam resolution of the preferred transmitting beam in the first beam level.

15. The method as claimed in claim 12, further comprising:
receiving at least one second signal from at least one communications apparatus in the group of communications apparatuses, wherein the second signal comprises information regarding one or more detection metric(s) calculated by the communications apparatus for the transmitting beam(s) in the second beam level; and
selecting a preferred transmitting beam in the second beam level from the transmitting beam(s) in the second beam level according to the one or more detection metric(s) retrieved from the second signal.

16. The method as claimed in claim 12, further comprising:
broadcasting a resource allocation indication signal by using the preferred transmitting beam in the first beam level to inform the group of communications apparatuses about resource allocation of the transmitting beam(s) to be trained.

17. The method as claimed in claim 12, further comprising:
   multicasting a resource allocation indication signal to the group of communications apparatuses to inform the group of communications apparatuses about resource allocation of the transmitting beam(s) to be trained.

18. The method as claimed in claim 12, further comprising:
   unicasting a resource allocation indication signal to each communications apparatus in the group of communications apparatuses to inform the group of communications apparatuses about resource allocation of the transmitting beam(s) to be trained.

19. The method as claimed in claim 12, further comprising:
   transmitting a resource allocation indication signal to the group of communications apparatuses via a common control channel to inform the group of communications apparatuses about resource allocation of the transmitting beam(s) to be trained.

20. The method as claimed in claim 12, further comprising:
   transmitting a resource allocation indication signal to the group of communications apparatuses via a RRC layer signaling to inform the group of communications apparatuses about resource allocation of the transmitting beam(s) to be trained.

21. The method as claimed in claim 12, further comprising:
   determining whether to perform the 1-to-many beam training according to a number of communications apparatuses determining the same preferred transmitting beam in the first beam level.

22. The method as claimed in claim 12, wherein the group of communications apparatuses to join the 1-to-many beam training are selected further according to a mobility of the communications apparatuses determining the same preferred transmitting beam in the first beam level.

* * * * *